US011339679B1

(12) United States Patent
Lefebvre et al.

(10) Patent No.: US 11,339,679 B1
(45) Date of Patent: May 24, 2022

(54) TURBINE PROBE HEAT SHIELDING

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); Herve Turcotte, Sainte-Julie (CA); Gabriel Naccache, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/209,666

(22) Filed: Mar. 23, 2021

(51) Int. Cl.
*F01D 17/02* (2006.01)
*F01D 25/24* (2006.01)
*F02C 7/24* (2006.01)
*F02C 7/28* (2006.01)

(52) U.S. Cl.
CPC ............. *F01D 17/02* (2013.01); *F01D 25/24* (2013.01); *F02C 7/24* (2013.01); *F02C 7/28* (2013.01); *F05D 2220/323* (2013.01); *F05D 2240/55* (2013.01); *F05D 2270/80* (2013.01)

(58) Field of Classification Search
CPC .. F01D 17/02; F01D 25/24; F02C 7/24; F02C 7/28; F05D 2220/323; F05D 2240/55; F05D 2270/80
See application file for complete search history.

(56) References Cited

U.S. PATENT DOCUMENTS

| 4,597,675 | A | 7/1986 | Maertins et al. |
| 9,551,281 | B2 | 1/2017 | Lefebvre et al. |
| 9,880,059 | B2 | 1/2018 | Myers et al. |
| 10,876,426 | B2 | 12/2020 | Smith |
| 2007/0256404 | A1* | 11/2007 | Lefebvre ................... F02C 7/22 60/39.091 |
| 2012/0247108 | A1* | 10/2012 | Romig .................. F01D 21/003 60/722 |
| 2020/0088606 | A1* | 3/2020 | Warren ...................... F02C 7/00 |
| 2020/0300810 | A1* | 9/2020 | Liu ..................... G01R 33/1223 |

* cited by examiner

*Primary Examiner* — Igor Kershteyn
(74) *Attorney, Agent, or Firm* — Norton Rose Fulbright Canada LLP.

(57) ABSTRACT

A thermal shielding arrangement for a turbine probe extending through an exhaust case and a turbine housing of a gas turbine engine comprises a sleeve having a radially inner end fixedly mounted to the turbine housing and a radially outer end floatingly received in a probe boss on the exhaust case. The radially outer end of the sleeve opens to an air cavity between the exhaust case and a surrounding engine nacelle to allow for air circulation around the probe.

20 Claims, 3 Drawing Sheets

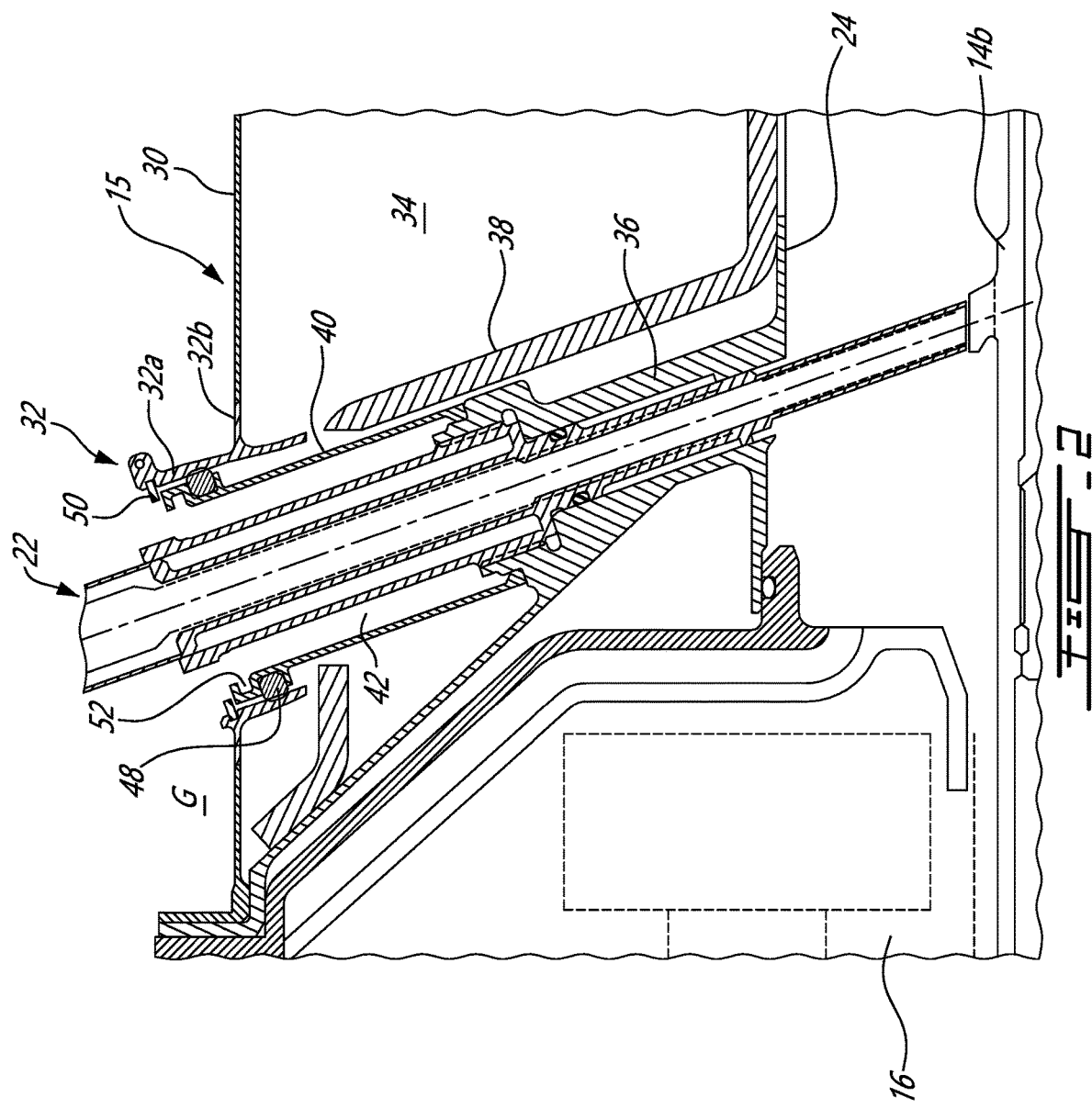

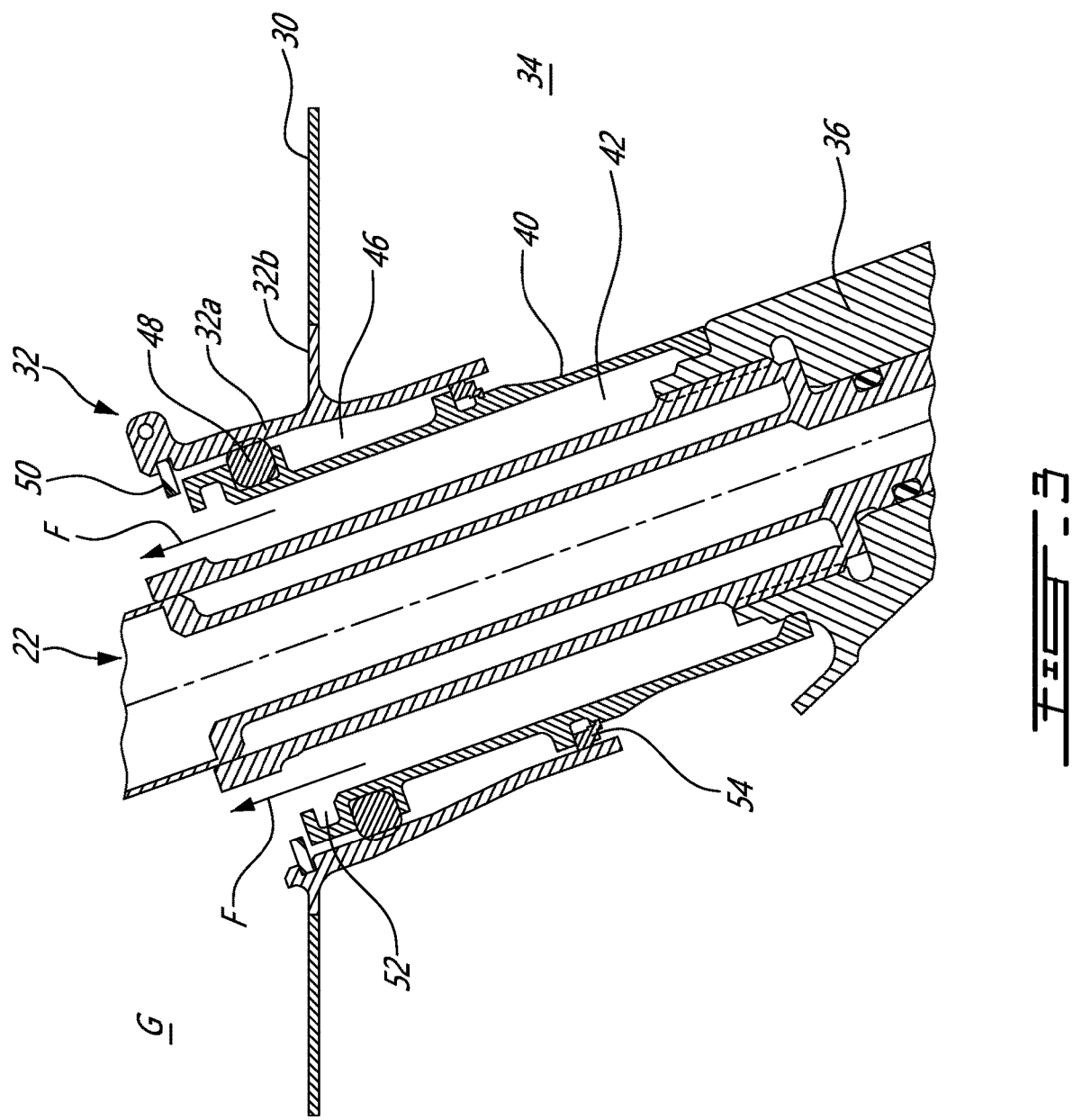

TURBINE PROBE HEAT SHIELDING

TECHNICAL FIELD

The application relates generally to gas turbine engines and, more particularly, to a thermal protection for a probe disposed in a hot section of a gas turbine engine.

BACKGROUND OF THE ART

A gas turbine engine includes sections at low temperatures, namely cold section modules, and sections at high temperatures, namely hot section modules. The cold section modules include for example the compressor, while the hot section modules include for example, the combustor and the turbine. While some mechanical components may sustain the high temperatures prevailing in the hot section modules, probes may not sustain these high temperatures, and their functioning could be altered by the hot ambient gases present in hot section modules.

SUMMARY

In one aspect, there is provided a gas turbine engine hot section comprising: a turbine housing extending around a central axis and having a first probe boss; an exhaust case surrounding the turbine housing and having a second probe boss aligned with the first probe boss on the turbine housing, a cavity radially between the turbine housing and the exhaust case; a turbine probe extending through the second probe boss, the cavity and the first probe boss; and a sleeve extending radially outwardly from the turbine housing through the cavity and into the second probe boss, the sleeve circumscribing an air gap around the turbine probe, the air gap opening to an environment outside the exhaust case.

In another aspect, there is provided an aircraft power plant comprising: a nacelle; a gas turbine engine mounted in the nacelle, the gas turbine engine comprising: a compressor; a turbine drivingly connected to the compressor, the turbine housed in a turbine housing extending around a central axis, the turbine housing having a first probe boss; an exhaust case for discharging combustion gases received from the turbine, the exhaust case surrounding the turbine housing and having a second probe boss aligned with the first probe boss; a turbine probe extending through the first and second probe bosses and into the turbine housing; and a sleeve projecting from the first probe boss into the second probe boss, the sleeve circumscribing an air gap around the turbine probe, the air gap in fluid communication with an air cavity between the nacelle and the exhaust case.

In a further aspect, there is provided a thermal shielding arrangement for a turbine probe extending through an exhaust case and a turbine housing of a gas turbine engine having an axis, the thermal shielding arrangement comprising: a sleeve having a radially inner end fixedly mounted to the turbine housing and a radially outer end floatingly received in a probe boss on the exhaust case, the radially outer end of the sleeve opening to an air cavity between the exhaust case and a surrounding engine nacelle.

DESCRIPTION OF THE DRAWINGS

Reference is now made to the accompanying figures in which:

FIG. 2 is an enlarged axial cross-section view illustrating a heat shield sleeve extending around a turbine probe in a cavity between an exhaust case and a power turbine housing of the engine shown in FIG. 1; and FIG. 3 is a further enlarged cross-section view illustrating details of the assembly of the sleeve between the power turbine housing and the exhaust duct.

DETAILED DESCRIPTION

Figure 1:
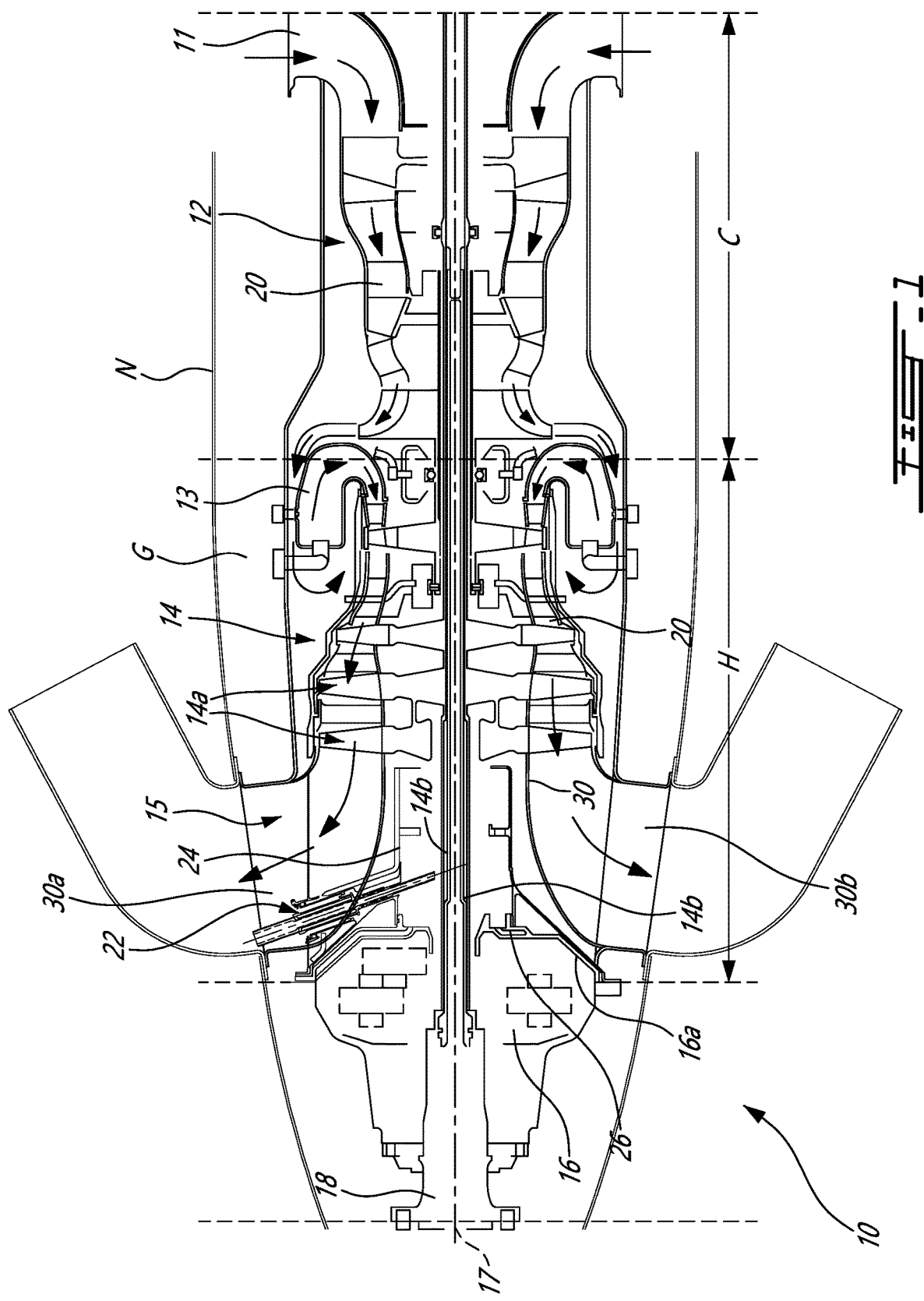
FIG. 1 is a schematic longitudinal/axial cross-section view of a boosted reverse flow gas turbine engine having a thermally shielded turbine probe.

FIG. 1 illustrates an aircraft power plant comprising a nacelle N housing a gas turbine engine 10 of a type preferably provided for use in subsonic flight, and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust case 15 through which the combustion gases exit the engine 10. The turbine 14 includes a low pressure (LP) or power turbine 14a drivingly connected to an input end of a fully enclosed reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. The exemplary embodiment shown in FIG. 1 is a "reverse-flow" engine because gases flow through the gaspath 20 from the air inlet 11 at a rear portion thereof, to the exhaust case 15 at a front portion thereof. According to one aspect, the engine 10 can have an engine architecture corresponding to that of the engine described in applicant's U.S. Pat. No. 10,393,027 issued on Aug. 27, 2019, the entire content of which is herein incorporated by reference.

As shown in FIG. 1, the exhaust case 15 may comprise an asymmetric dual port exhaust duct 30 for exhausting combustion gases received from the last stage of the LP turbine 14a on opposed sides of the engine 10. The dual port exhaust duct 30 is qualified as "asymmetric" because the two exhaust ports thereof are not coaxial to the engine centerline 17 (i.e. the exhaust flow discharged from the exhaust duct is not axial, it is rather discharged in a direction that diverges from the engine centerline 17). According to at least some embodiments, the dual port exhaust duct 30 has a generally "Y-shaped" annular body including an annular central inlet conduit portion extending axially around the engine centerline 17 for receiving the annular flow of combustions gases discharged from the last stage of LP turbine 14a, and first and second diverging outlet conduit portions 30b, 30c branching off laterally from the central inlet conduit portion. According to some embodiments, the first and second outlet conduit portions 30b, 30c are identical.

Still referring jointly to FIG. 1, it can be seen that the turbine 14 comprises a power or LP turbine housing 24 mounted to and extending axially from the RGB 16 centrally into the hollow center of the annular exhaust duct 30. The LP turbine housing 24 is configured to receive a bearing (not shown) for supporting the LP turbine rotor(s). During assembly, the exhaust duct 30 is axially slid in position over the LP turbine housing 24. Once the exhaust duct 30 has been properly positioned over the LP turbine housing 24, the two are detachably secured to the RGB 16 such as by bolting at a front flange interface.

Still referring to FIG. 1, it can be seen that the engine 10 has a cold section C that is under a "relatively" cold ambient temperature. The cold section C includes the air inlet 11 and the compressor 12. The engine 10 also has a hot section H, which in use, is subject to high temperatures. The hot section H includes the combustor 13, the turbine 14 and the exhaust case 15. For instance, the temperatures inside the turbine 14 are typically in excess of 1000 degree. C. In use, the continuous flow of gas to which the turbine 14 is exposed can be at temperatures up to 1700 degree. C.

The engine 10 is equipped with a plurality of probes (sensors) for measuring various operating parameters, such as torque, speed, distance, temperature, pressure etc. Some of these probes are disposed in the hot section H of the engine 10. Accordingly, these probes need to be able to cope with the high temperatures prevailing in the hot section H of the engine 10. It may thus be desirable to thermally shield the probes in order to maintain the temperature of the probes within acceptable limits. FIGS. 1-3 illustrate an example of such a thermally shielded probe. More particularly, FIGS. 1-3 illustrate a probe 22 projecting through the exhaust case 15 and the LP turbine housing 24 to a location where a tip of the probe 22 is positioned adjacent to the LP turbine shaft 14b for measuring an operating parameter (e.g. speed and/or torque) of the LP turbine 14a.

The exemplary probe 22 extends through a probe boss 32 mounted in a receiving hole defined at the top dead center of the exhaust duct 30 between the two diverging outlet conduit portions 30b, 30c thereof. The term "boss" is herein intended to generally refer to a mounting feature on a work piece. For instance, it can take the form of a protruding feature used to locate one component (e.g. a probe) within a pocket or hole of another component (e.g. the exhaust duct). As exemplified in FIGS. 2-3, the probe boss 32 may be provided in the form of a cylindrical sleeve 32a cast with an outer flange 32b welded or otherwise suitably secured to the exhaust duct 30. According to some embodiments, the sleeve 32a has a slanted tubular portion that projects inwardly into the exhaust duct 30 in a "dead" air cavity 34 radially between the LP turbine housing 24 the exhaust duct 30. The slanted tubular portion is aligned with an associated probe boss 36 provided on the turbine housing 24. The aligned probe bosses 32, 36 provide a passage for the probe 22 through the exhaust case 15 and the turbine housing 24. As shown in FIG. 2, the probe 22 extends through the registering probe bosses 32, 36 and into the LP turbine housing 24 next to the LP turbine shaft 14b. The tip portion of the probe 22 is thermally shielded by the oil contained in the LP turbine housing 24. However, the upper portion of the probe 22 in the cavity 34 between the exhaust duct 30 and the turbine housing 24 does not benefit from the heat shielding action of the oil in the turbine housing 24. Accordingly, a probe heat shield is provided in the cavity 34 to protect the upper portion of the probe 22 from heat radiations emanating from the exhaust duct 30. As will be seen hereinafter, the probe heat shield is configured to create a heat shielding volume of air or air gap around the turbine probe 22 along a radial extent of the cavity 34 between the exhaust duct 30 and the LP turbine housing 24 while allowing for the assembly of the exhaust duct 30 over the LP turbine housing 24.

As shown in FIG. 2, the probe heat shield may include a thermal blanket 38 mounted to a radially outer surface of the turbine housing 24 so as to cap or surround the probe boss 36. The thermal blanket 38 can include a thermal insulation core (e.g. high temperature insulation fiber/wool materials) encapsulated in a metallic skin (e.g. sheet metal or metallic foil). The thermal blanket 38 forms a protective enclosure around a first portion of the length the probe projecting radially outwardly from the LP turbine probe boss 36. However, as shown in FIG. 2, the protective enclosure formed by the thermal blanket 38 on the LP turbine housing 24 only radially extends along a portion of the cavity 34. Indeed, the radially outer end of the thermal blanket 38 through which the probe 22 extends is spaced radially inwardly from the inner end of the probe boss 32 on the exhaust duct 30 so as to permit axial assembly of the exhaust duct 30 over the LP turbine housing 24.

To further thermally shield the probe 22 from heat radiation in cavity 34, the heat shield comprises a sleeve 40, which bridges the space between the LP turbine housing 24 and the exhaust case 15. The sleeve 40 creates an additional air chamber in the form of an annular air gap 42 around the probe 22. As can be appreciated from FIGS. 2 and 3, the air gap 42 is opened to the cooler environment surrounding the exhaust case 15 to allow air circulation around the probe 22 to occur by natural convection. According to the illustrated embodiment, the sleeve 40 and, thus, the air gap 42 open to an air cavity G between the exhaust case 15 and the nacelle N. As depicted by flow arrows F in FIG. 3, the sleeve 40 may act as a chimney to evacuate heat in the air gap 42 around the probe 22 into the cooler environment surrounding the exhaust case 15 (i.e. the air cavity G between the exhaust case 15 and the nacelle N according to the illustrated embodiment). The chimney effect (natural convection) will be prominent when there us little nacelle ventilation flow in cavity G when the aircraft is stationary. However, the sleeve 40 also allows cool air to enter the cavity 42 during flight when there will be plenty of ventilation cooling flow in cavity G.

As shown in FIGS. 2 and 3, the sleeve 40 has a radially inner cylindrical end fixedly attached to the turbine housing 24. More particularly, the inner end of the sleeve 40 is mounted to and extends from the probe boss 36 of the LP turbine housing 24. According to some embodiments, the sleeve 40 is assembled on the probe boss 36 with a tight fit. For instance, the radially inner end of the sleeve 40 may be thermally expanded prior to being engaged over the probe boss 36 and then allowed to cool down to create an interference fit with the probe boss 36. According to such embodiments, the material of the sleeve 40 is selected to have the same coefficient of thermal expansion as that of the probe boss 36 of the LP turbine housing 24 to preserve the integrity of the interference fit during engine operation. For instance, the LP turbine housing 24 and the sleeve 40 could be made from a nickel-based superalloy (e.g. Inconel 625).

It can be appreciated from FIG. 2 that the thermal blanket 38 on the power turbine housing 38 overlap the radially inner end of the sleeve 40. According to the illustrated embodiment, the sleeve 40 extends radially into the space thermally shielded by the thermal blanket 38 around the probe boss 36.

The radially outer end of the sleeve 40 is floatingly/movably received in the second probe boss 32 (i.e. the probe boss on the exhaust duct 30) for relative movement with respect thereto in response to thermal growth. As best seen in FIG. 3, the radially outer end of the sleeve 40 is spaced from a surrounding inner surface of the probe boss 32 by an annular control gap 46. A compressible seal, such as a rope seal 48, extends across the annular control gap 46. The rope seal 48 may be removably mounted in an annular groove defined in an outer surface of the radially outer end of the sleeve 40. The rope seal 48 is made out of a compressible material to provide sealing as well as damping between the sleeve 40 and the probe boss 32 of the exhaust case 15. More particularly, the rope seal 48 prevents hot air leakage from cavity 34 into the air cavity G while limiting the transmission of vibration between sleeve 40 and the probe boss 32. In addition, the rope seal 48 prevents water or sand/dirt particles from being ingested from cavity G to cavity 34.

As a design proofing, a retaining ring 50 may be removably mounted to an inner surface of the probe boss 32 at a location radially outward relative to the radially outer end of the sleeve 40 to secure the part installation. A puller groove 52 is defined in an inner surface of the radially outer end of the sleeve 40 for engagement with an extractor tool (now shown) to facilitate removal of the sleeve 40 when need be.

As shown in FIG. 3, a piston ring 54 may be provided at a radially inner end of the probe boss 32 to seal the annular control gap 46 is sealed from the cavity 34. The piston ring 54 may be mounted in a seat on a radially outer surface of the sleeve 40.

The sleeve 40 is installed in position after the exhaust case 15 and the power turbine housing 24 have been assembled together. The sleeve 40 is first thermally expanded and then inserted in position over the first probe boss 36 via the second probe boss 32. Then, the sleeve 40 is allowed to cool down to cause the radially inner end of the sleeve to contract against the outer surface of the first probe boss 36. The so created interference fit secures the attachment of the sleeve 40 on the power turbine housing 24. The installation is completed by installing the retaining ring 50 at the radially outer end of the sleeve 32. The rope seal 48 and the piston ring 54 are installed on the sleeve 40 prior to the sleeve 40 being inserted through the probe boss 32.

In view of the foregoing, it can be appreciated that at least some embodiments allow the installation of a thermally shielded probe in the LP turbine housing without introducing added complexity in the engine architecture. The sleeve mounting arrangement provides a simple solution to thermally protect the turbine probe 22 from heat radiation emanating from the exhaust duct 30.

The above description is meant to be exemplary only, and one skilled in the art will recognize that changes may be made to the embodiments described without departing from the scope of the invention disclosed. For instance, while the probe installation has been described in the context of a turboprop/turboshaft engine architecture, it is understood that it could be applied to other engines, including turbofan and auxiliary power unit (APU) engines. Also, while the exemplified probe is installed on the power turbine housing, it is understood that it could be installed on other structures of the hot section of the gas turbine engine. Also, it is understood that the present disclosure is not limited to speed or torque probes. Other modifications which fall within the scope of the present invention will be apparent to those skilled in the art, in light of a review of this disclosure, and such modifications are intended to fall within the appended claims.

The invention claimed is:

1. A gas turbine engine hot section comprising:
   a turbine housing extending around a central axis and having a first probe boss;
   an exhaust case surrounding the turbine housing and having a second probe boss aligned with the first probe boss on the turbine housing,
   a cavity radially between the turbine housing and the exhaust case;
   a turbine probe extending through the second probe boss, the cavity and the first probe boss; and
   a sleeve extending radially outwardly from the turbine housing through the cavity and into the second probe boss, the sleeve circumscribing an air gap around the turbine probe, the air gap opening to an environment outside the exhaust case.

2. The gas turbine engine hot section according to claim 1, wherein the sleeve has a radially inner end fixedly attached to the turbine housing and a radially outer end movably received inside the second probe boss.

3. The gas turbine engine hot section according to claim 2, wherein the radially inner end of the sleeve is assembled on the first probe boss with an interference fit, and wherein the sleeve and the first probe boss have a same coefficient of thermal expansion.

4. The gas turbine engine hot section according to claim 2, wherein the radially outer end of the sleeve is spaced from the an inner surface of the second probe boss by an annular control gap, and wherein a rope seal extends across the annular control gap.

5. The gas turbine engine hot section according to claim 4, wherein the rope seal is removably mounted in an annular groove defined in an outer surface of the radially outer end of the sleeve.

6. The gas turbine engine hot section according to claim 2, wherein a retaining ring is removably mounted to an inner surface of the second probe boss at a location radially outward relative to the radially outer end of the sleeve.

7. The gas turbine engine hot section according to claim 2, wherein a puller groove is defined in an inner surface of the radially outer end of the sleeve.

8. The gas turbine engine hot section according to claim 4, wherein the annular control gap is sealed from the cavity at a radially inner end of the second probe boss by a piston ring mounted to the sleeve.

9. The gas turbine engine hot section according to claim 1, wherein the exhaust case comprises an asymmetric dual exhaust duct having first and second outlet duct portions diverging from the central axis for discharging combustion gases, and wherein the second probe boss is disposed between the first and second outlet duct portions.

10. An aircraft power plant comprising:
    a nacelle;
    a gas turbine engine mounted in the nacelle, the gas turbine engine comprising:
    a compressor;
    a turbine drivingly connected to the compressor, the turbine housed in a turbine housing extending around a central axis, the turbine housing having a first probe boss;
    an exhaust case for discharging combustion gases received from the turbine, the exhaust case surrounding the turbine housing and having a second probe boss aligned with the first probe boss;
    a turbine probe extending through the first and second probe bosses and into the turbine housing; and
    a sleeve projecting from the first probe boss into the second probe boss, the sleeve circumscribing an air gap around the turbine probe, the air gap in fluid communication with an air cavity between the nacelle and the exhaust case.

11. The aircraft power plant according to claim 10, wherein the sleeve has a radially inner end fixedly attached to the first probe boss on the turbine housing and a radially outer end floatingly received inside the second probe boss for relative movement with respect thereto in response to thermal growth.

12. The aircraft power plant according to claim 11, wherein the radially inner end of the sleeve is assembled with a tight fit over the first probe boss.

13. The aircraft power plant according to claim 11, wherein the radially outer end of the sleeve is spaced from the an inner surface of the second probe boss by a control gap, and wherein a compressible seal extends across the control gap.

14. The aircraft power plant according to claim 13, wherein the compressible seal comprises a rope seal removably mounted in an annular groove defined in an outer surface of the radially outer end of the sleeve.

15. The aircraft power plant according to claim 11, wherein a retaining ring is removably mounted to an inner surface of the second probe boss at a location radially outward relative to the radially outer end of the sleeve.

16. The aircraft power plant according to claim 11, wherein a puller groove is defined in an inner surface of the radially outer end of the sleeve.

17. The aircraft power plant according to claim 13, wherein the control gap is sealed from a cavity radially between exhaust case and the turbine housing by a piston ring mounted to the sleeve for sealing engagement with a radially inner end of the second probe boss.

18. The aircraft power plant according to claim 10, wherein the exhaust case comprises an asymmetric dual exhaust duct having first and second outlet duct portions diverging from the central axis for discharging combustion gases, and wherein the second probe boss is disposed at a circumferential location between the first and second outlet duct portions.

19. A thermal shielding arrangement for a turbine probe extending through an exhaust case and a turbine housing of a gas turbine engine having an axis, the thermal shielding arrangement comprising: a sleeve having a radially inner end fixedly mounted to the turbine housing and a radially outer end floatingly received in a probe boss on the exhaust case, the radially outer end of the sleeve opening to an air cavity between the exhaust case and a surrounding engine nacelle.

20. The thermal shielding arrangement according to claim 19, further comprising a thermal blanket overlapping the radially inner end of the sleeve.

\* \* \* \* \*